UNITED STATES PATENT OFFICE.

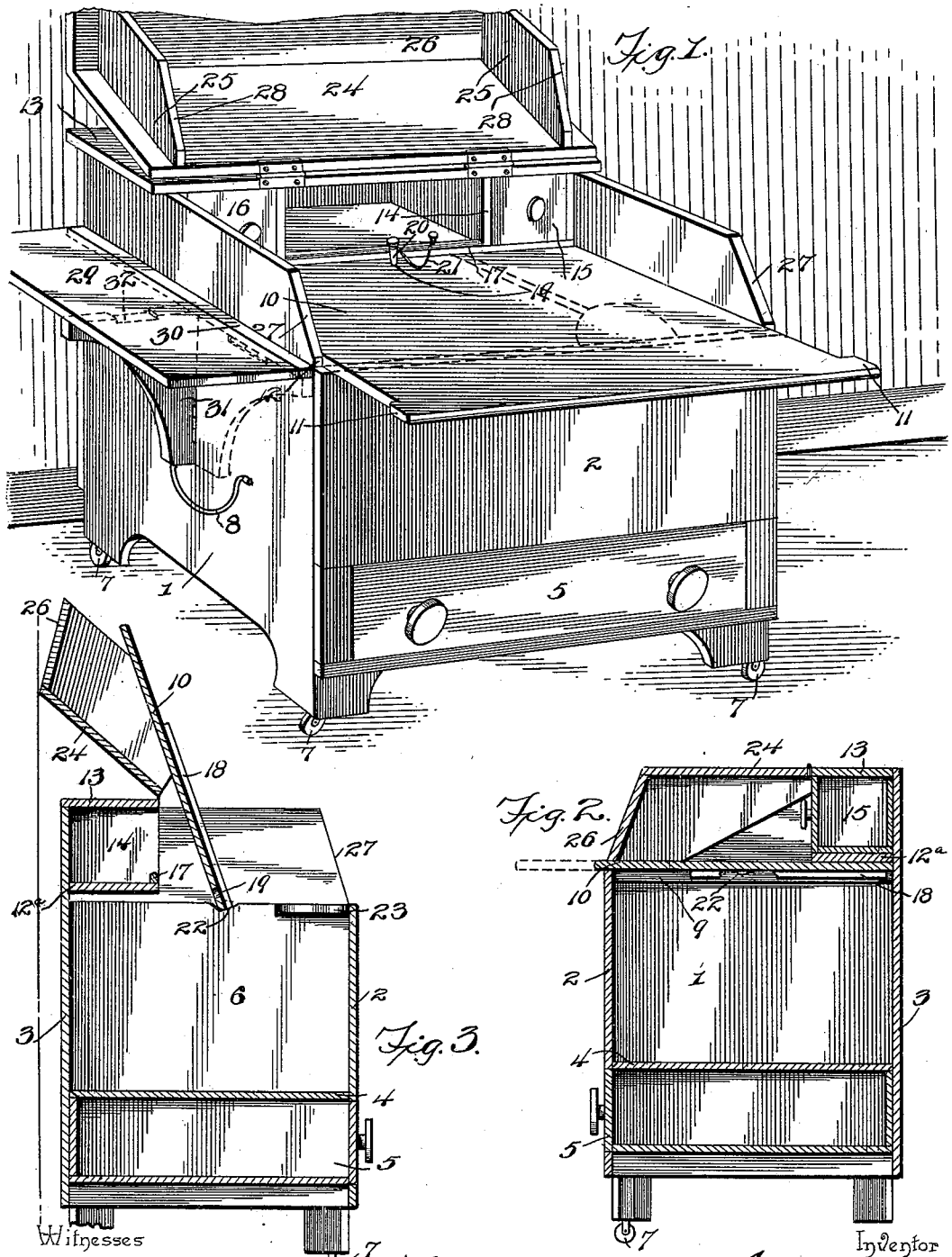

FRANK O. GOODALE, OF KEMPNER, TEXAS.

KITCHEN-CABINET.

SPECIFICATION forming part of Letters Patent No. 637,456, dated November 21, 1899.

Application filed July 17, 1899. Serial No. 724,113. (No model.)

*To all whom it may concern:*

Be it known that I, FRANK O. GOODALE, a citizen of the United States, residing at Kempner, in the county of Lampasas and State of Texas, have invented a new and useful Kitchen-Cabinet, of which the following is a specification.

This invention relates to kitchen-cabinets, and is particularly designed for containing flour, meal, &c., conveniently arranged for use in making bread.

A further object is to provide an improved bread or kneading board, which forms a cover for the flour and meal bins, is provided with improved means for holding the board against accidental movement when the dough is being kneaded thereon, and is also adapted to be tilted or thrown upward, so as to have access to the flour and meal bins.

To these ends the present invention consists in the combination and arrangement of parts, as will be hereinafter more fully described, shown in the accompanying drawings, and particularly pointed out in the appended claims, it being understood that changes in the form, proportion, size, and the minor details of construction may be made within the scope of the appended claims without departing from the spirit or sacrificing any of the advantages of the present invention.

In the drawings, Figure 1 is a perspective view of the improved kitchen-cabinet having the cover thereof thrown backward or open and the bread-board drawn out into position for use. Fig. 2 is a transverse sectional view taken to the left side of the center of the cabinet and showing the latter in closed position. Fig. 3 is a central transverse sectional view showing the cover thrown open and the bread-board tilted upward, so as to have access to the flour and meal bins.

Corresponding parts in the several figures of the drawings are designated by like characters of reference.

Referring to the accompanying drawings, 1 designates the opposite ends, and 2 and 3 the front and rear sides, respectively, of the rectangular body of the cabinet. The opposite ends and the rear side project above the front, so as to provide space for the breadboard and suitable receptacles for containing salt, soda, and other necessary articles for making bread. A suitable horizontal partition 4 is located near the bottom of the cabinet, so as to divide the latter into a comparatively large upper compartment and a small lower compartment, the latter being provided with a drawer 5, which may be opened outward through the front of the cabinet. The upper compartment is divided transversely by means of an upright partition 6, which forms a flour and a meal bin, the former being preferably the larger and each bin being open at its top. Suitable casters 7 are provided at the four lower corners of the cabinet, so that the latter may be conveniently moved from place to place, and each end is provided with a handle 8 for facilitating the moving of the cabinet.

Fitted to the inner side of each end of the cabinet and on a level with the upper edge of the vertical partition 6 is a strip 9, and supported upon these two strips and the upper edge of the partition 6 is the bread-board 10, which is slidable in and out between the opposite ends of the cabinet. Projecting at opposite sides of the board and at the outer end thereof are shoulders 11, which are adapted to engage against the respective front edges 12 of the opposite ends of the cabinet, immediately above the front thereof, so as to prevent the board from being pushed too far inward and to provide an outwardly-projecting portion, as shown in Fig. 2, for conveniently pulling the board outward when required for use.

At the rear of the cabinet and immediately above the top edge of the partition 6 is a comparatively narrow horizontal partition or shelf $12^a$, extending the entire distance between the opposite ends of the cabinet, and fitted above this shelf is a fixed top 13, equal in width to the shelf $12^a$ and forming therewith a horizontal compartment. This compartment is divided into three others by means of a pair of vertical partitions 14, and mounted in the outer compartments are suitable drawers 15 and 16, respectively, for containing salt, soda, and the like. Fitted to the upper side of the shelf 12ª and extending the entire distance between the opposite partitions 14 is a bead or stop 17, adapted to retain within the central compartment such utensils or other articles which may be placed therein.

To hold the bread-board against accidental movement when the dough is being kneaded thereon, one or more cleats 18 are provided upon the under side of the board and terminating short of the outer edge thereof, and the outer end of each cleat is adapted to abut against the inner side of the front of the cabinet, so as to prevent outward movement of the board. Besides forming stops for the board these cleats also strengthen the latter and prevent warping thereof. Intermediate of the opposite sides of the board and near the rear end thereof there is provided an opening 19, adapted to receive a suitable pin or peg 20, which engages against the outer edge of the shelf 12ª, so as to prevent the board from being pushed inward. Thus it will be seen that the board is effectively held against inward or outward movement when in use. To prevent loss of the pin or peg 20, the latter is provided with a chain or cord 21, which is fastened to the shelf 12ª, so that said pin may be contained between the opposite partitions 14 and also prevented from dropping into either the flour or meal bins.

From the foregoing description it will be apparent that the bread-board normally closes the upper open ends of the flour and meal bins, so that it is necessary to remove the board to have access to the bins. To facilitate the removal of the board, the upper edges of the upright partition 6 and the opposite strips 9 are each provided with a notch 22, and after the board has been drawn outward, so that its inner or rear end is removed from beneath the shelf 12ª, the board is tilted upward and its lower or rear edge is fitted in the respective notches, whereby it is not necessary to entirely remove the board from the cabinet, and access may be conveniently had to both the flour and meal bins. Fitted to the forward end of the partition 6 is a shelf or bracket 23, which is flush with the upper edge of the partition and also the upper edge of the front 2, so as not to interfere with the bread-board in its normal position, and is adapted to form a support for the receptacle into which the flour or meal is to be placed.

Hinged to the outer edge of the fixed top 13 is a cover 24, having opposite ends 25, which are spaced inward from the end extremities of the cover, and also a forward side 26, which extends the entire length of the cover flush against the outer edge of the respective end pieces 25 and flared outwardly from the cover. The outer upper edges of the opposite ends 1 of the cabinet are beveled or inclined, as at 27, so that the extremities of the forward side 26 of the cover may fit flush against the beveled or inclined portions and form a tight closure for the upper open end of the cabinet. It will be noted that the shoulders 11 upon the bread-board will fill up the spaces which would occur between the front 2 and the adjacent edges of the ends 1, so as to prevent accumulations of dust and dirt in such spaces.

By reference particularly to Fig. 3 of the drawings it will be seen that the cabinet is preferably arranged adjacent to the wall of a room, so that the cover may rest against the wall when the cabinet is being used and may also form a support for the upper or outer end of the bread-board. The inner portion of the lower edge of each end piece 25 of the cover is preferably beveled or inclined, as at 28, so that the bread-board when tilted up may rest flush against the inclined edges and the latter may form a firm support for the board.

Fitted to the exterior of one end of the cabinet is a drop-shelf 29, hinged to a fixed transverse strip 30, fastened to the end of the cabinet. A laterally-foldable supporting-bracket 31 is hinged to the cabinet and normally supports the shelf in a horizontal position. As indicated in dotted lines, the bracket may be folded against the end of the cabinet and shelf dropped down against the side of the bracket. The upper edge of the bracket is provided with a notch 32 to receive one of the hinges of the shelf in the folded position thereof.

What I claim is—

1. In a kitchen-cabinet, the combination with the body thereof, having a vertical partition, of a fixed top terminating short of the front of the cabinet, a cover hinged to the front edge of the fixed top, and provided with opposite end pieces having beveled or inclined edges, and a bread-board slidable within the cabinet and upon the top of the partition, and capable of being tilted upward flush against the inclined edges of the end pieces of the cover, when the latter is in open position, and having the rear end of the board supported upon the partition, substantially as and for the purpose set forth.

2. A kitchen-cabinet, comprising a body having a vertical partition, a bracket fitted to the forward end of the partition and flush with the upper edge thereof and with the front of the cabinet, and a bread-board supported upon the upper edge of the partition, closing the upper open end of the bins or compartments formed by the partition, and capable of being removed therefrom to open said compartments, substantially as shown and described.

3. In a kitchen-cabinet, the combination with the body thereof, of a slidable bread-board extending from end to end of the body, normally projecting beyond the front thereof, and provided at its front edge and at opposite sides with shoulders engaging the adjacent outer edges of the ends of the cabinet, and extending to the outer faces of said ends, and a hinged cover having a front side normally resting upon the projecting front edge of the bread-board and extending to the outer ends of the shoulders thereof, substantially as shown and described.

In testimony that I claim the foregoing as my own I have hereto affixed my signature in the presence of two witnesses.

FRANK O. GOODALE.

Witnesses:
R. R. LAKE,
H. W. WOOTTON.